R. M. ROSE.

Embroidering-Attachments for Sewing-Machines.

No. 6,005. Reissued Aug. 11, 1874.

Witnesses
John Becker.
Fred Haynes

Inventor:
R. M. Rose
by his Attorneys
Brown & Allen

THE GRAPHIC CO. PHOTO-LITH. 39 & 41 PARK PLACE, N.Y.

UNITED STATES PATENT OFFICE.

REUBEN M. ROSE, OF WILLIAMSBURG, BROOKLYN, NEW YORK, ASSIGNOR TO THE NONPAREIL EMBROIDER COMPANY, OF NEW YORK CITY.

IMPROVEMENT IN EMBROIDERING ATTACHMENTS FOR SEWING-MACHINES.

Specification forming part of Letters Patent No. 148,761, dated March 17, 1874; reissue No. 6,005, dated August 11, 1874; application filed June 13, 1874.

*To all whom it may concern:*

Be it known that I, REUBEN M. ROSE, of Williamsburg, in the city of Brooklyn, county of Kings and State of New York, have invented certain Improvements in Embroidery Attachments to Sewing-Machines, of which the following is a specification:

This invention relates to embroidery attachments to sewing-machines that operate to lay an embroidery-thread upon the upper surface of the fabric, and which is secured by an independent sewing-thread, two needles and a shuttle, or their equivalents, being used. Furthermore, the embroidery-stitch made by my invention is a well-known one, the same consisting of a succession of coils which the sewing-thread is made to interlace, to accomplish which my invention admits of ordinary-shaped needles being used. To these ends, my invention includes a presser-foot attachment, which may be applied to any ordinary sewing-machine in place of the usual foot, and has combined with it a horizontally-reciprocating eye-pointed needle, and mechanism for operating the same by the sewing-needle bar, so that the embroidery-thread, which is carried by the horizontal needle, is first worked by the latter in front of the sewing-needle, then moved laterally by a positive motion applied to the horizontal needle, that is thus thrown back of the sewing-needle during the ascent of the latter, and across its path, and subsequently returned laterally to its normal position, while the sewing-needle in its descent enters the loop of the embroidery-thread, which, by the straight reciprocating action of the horizontal needle in the line of the feed, and its lateral action combined, coils the embroidery-thread, as it were, around the sewing-needle.

Figure 1:
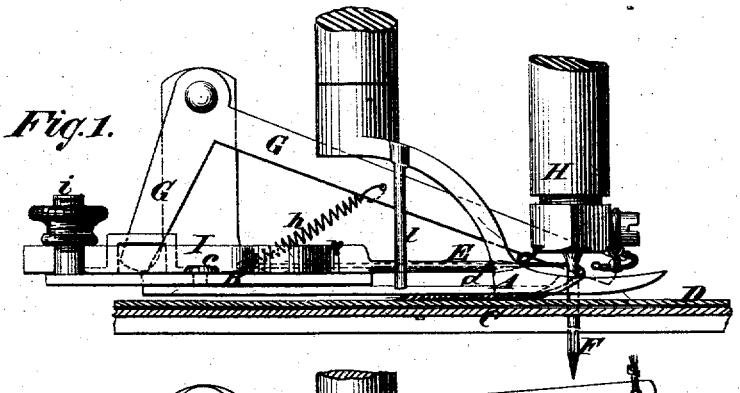
Figure 2:
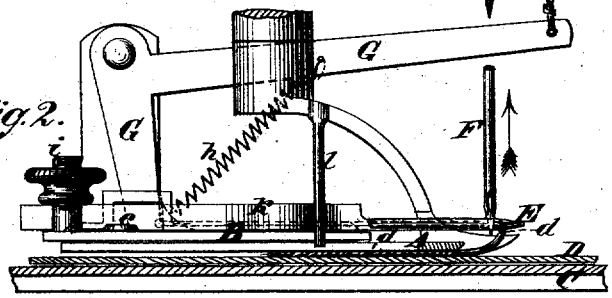
Figure 3:
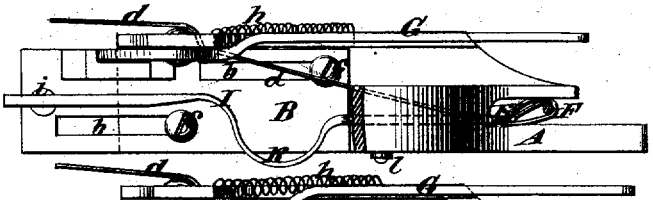
Figure 4:
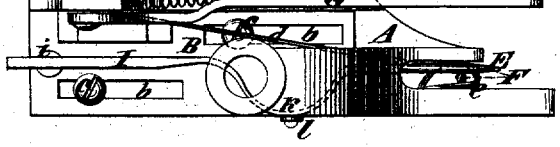
Figure 5:
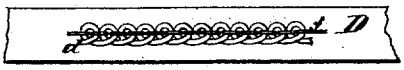

In the accompanying drawing, Figure 1 represents a front elevation of my embroidery attachment in relation with the sewing-needle when the latter is down; Fig. 2, a like view of similar devices, but showing the sewing-needle as in the act of ascending, shortly before the embroidery needle is thrown laterally back of it. Fig. 3 is a plan with the parts in the position represented in Fig. 1; Fig. 4, a plan after the embroidery-needle has been thrown back of the sewing-needle, and Fig. 5 a top view of a piece of fabric with the embroidery-stitch as produced thereon.

A is the presser-foot or shoe, provided on the upper surface of its bearing portion with a horizontal carrier or slide, B, moving in direction of the line of feed, and which may be guided in its reciprocating movement by slots *b* and projections *c*. C is the bed or table of the sewing-machine, and D the material to be embroidered. The horizontal slide or carrier B has attached to it, in advance of its forward end, a horizontal eye-pointed needle, E, which carries the embroidery-thread *d*, and which is so arranged, relatively to the sewing-needle F, that in the forward motion of the slide it causes the horizontal needle E, with its embroidery-thread *d*, to be projected in front of the sewing-needle F shortly before the latter completes its ascent, as represented in Fig. 2. The sewing-needle F then completes its ascent, and in doing this the needle E, bearing against or lying immediately in front of the needle F, is moved laterally by a positive motion to the back of the needle F, as the latter in its ascent clears the horizontal needle E. This leaves a loop, *e*, of the embroidery-thread, as shown in Fig. 4, through which loop the needle F, in its succeeding descent with its sewing-thread *f*, passes, and the horizontal needle E moves laterally to its normal position in a line which is in advance of the needle, and subsequently moves backward in direction of the feed, while the sewing-needle F completes its descent and forms slack, through which a shuttle-thread is passed to lock the sewing-stitch. The horizontal needle E then moves forward again, with its embroidery-thread *d*, in front of the sewing-needle F, for a repetition of the action, as described. In this way, or by these means, the embroidery-thread is coiled, as it were, around the sewing-needle. In such action or combination of devices, the embroidery-thread needle has its horizontal longitudinal motion between the eye and point of the sewing-needle, also a lateral movement across the path of the sewing-needle when the latter is clear of the embroidery-thread. The horizontal reciprocating action of the needle E in line of the feed is effected by a bell-crank lever, G, the one arm of which is connected with the slide B, and the other, preferably by a cord or its equivalent, with the needle-bar H, or screw that holds the sewing-needle, so that the sewing-needle may have a dwell-motion for the passage of the shuttle before lifting on the lever G to project the horizontal needle in front of the sewing-needle. The reverse movement of the lever G, which draws the horizontal needle E back as the sewing-needle F makes its descent, I prefer to effect by means of a spring, *h*; but a positive motion may be used instead, if desired. The lateral throw or movement of the needle E back of the sewing-needle, as the latter completes its ascent, is effected in a positive manner. Thus the needle E is attached to a spring, I, which is carried by the slide at *i*, and is crooked at *k*, so that as the slide makes its forward movement, it, or the crook *k*, comes in contact with a stop, *l*, which moves the needle E laterally back of the sewing-needle, and so that, when the latter commences its descent, the spring I throws the needle E laterally, in a reverse direction, to a position in line with the front of the sewing-needle, as required. Instead of the spring I, however, the needle E may be attached to a pivoted bar or lever, which is made to receive a positive lateral motion in both directions as the slide B is reciprocated; but it is preferred to use the spring I, as such provides for irregularities of the needle-thread.

I claim—

1. The combination, with the presser-foot, of a carrier arranged to reciprocate in a direction which is at the same time parallel, or thereabout, with the length of the embroidery-thread needle, and parallel, or thereabout, with the line of the feed, and carrying the said needle E, the latter having a lateral motion in relation to the sewing-needle, for operation in connection with the latter, substantially as specified.

2. The horizontal embroidery-thread needle E, arranged to reciprocate in direction of the feed, in combination with the stop *l* and spring or device carrying said needle, to give to said needle a positive movement relatively to the sewing-needle, as described.

3. The combination of the lever G with the slide B and needle E, having a lateral as well as a reciprocating motion relatively to the feed, as described.

R. M. ROSE.

Witnesses:

VERNON H. HARRIS,
MICHAEL RYAN.